United States Patent
Misra

(10) Patent No.: US 7,964,013 B2
(45) Date of Patent: Jun. 21, 2011

(54) FERH-FEPT CORE SHELL NANOSTRUCTURE FOR ULTRA-HIGH DENSITY STORAGE MEDIA

(75) Inventor: Devesh Kumar Misra, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 41 days.

(21) Appl. No.: 12/487,246

(22) Filed: Jun. 18, 2009

(65) Prior Publication Data
US 2010/0323219 A1 Dec. 23, 2010

(51) Int. Cl.
*B22F 9/18* (2006.01)

(52) U.S. Cl. .............. 75/362; 75/343; 75/370; 977/777; 977/810; 428/570

(58) Field of Classification Search .............. 75/343, 75/348, 351, 362–365, 369–371, 392, 413, 75/414, 416, 419–421, 425, 426, 430, 433, 75/631, 633, 710, 711, 721–723, 732, 739, 75/741; 427/215–217; 428/800–848.9, 544–687; 977/773–775, 777, 810; 423/138–154, 22; B22F 9/00, 9/16, 9/18, 9/20, 9/24, 9/30
See application file for complete search history.

(56) References Cited

U.S. PATENT DOCUMENTS

| | | | |
|---|---|---|---|
| 4,692,378 A | 9/1987 | Ishihara et al. | |
| 4,707,410 A | 11/1987 | Hata et al. | |
| 4,717,622 A | 1/1988 | Kurokawa et al. | |
| 4,740,419 A | 4/1988 | Asai et al. | |
| 4,900,631 A | 2/1990 | Yamakawa et al. | |
| 5,006,406 A | 4/1991 | Kovacs et al. | |
| 5,062,021 A | 10/1991 | Ranjan et al. | |
| 5,082,714 A | 1/1992 | Yanai et al. | |
| 5,424,132 A | 6/1995 | Bobrich et al. | |
| 5,750,270 A | 5/1998 | Tang et al. | |
| 5,824,409 A | 10/1998 | Sellmyer et al. | |
| 5,851,643 A | 12/1998 | Honda et al. | |
| 5,900,324 A | 5/1999 | Moroishi et al. | |
| 6,007,623 A | 12/1999 | Thiele et al. | |
| 6,086,974 A | 7/2000 | Thiele et al. | |
| 6,139,907 A | 10/2000 | Sellmyer et al. | |
| 6,183,606 B1 | 2/2001 | Kuo et al. | |
| 6,221,508 B1 | 4/2001 | Kanbe et al. | |
| 6,248,416 B1 | 6/2001 | Lambeth et al. | |
| 6,254,662 B1 | 7/2001 | Murray et al. | |
| 6,280,813 B1 | 8/2001 | Carey et al. | |
| 6,331,364 B1 | 12/2001 | Baglin et al. | |
| 6,555,252 B2 | 4/2003 | Sellmyer et al. | |

(Continued)

OTHER PUBLICATIONS

E.V. Shevchenko, D.V. Talapin, H. Schnablegger, A. Kornowski, O. Festin, P. Svedlindh, M. Haase, H. Weller, "Study of Nucleation and Growth in the Organometallic Synthesis of Magnetic Alloy Nanocrystals: The Role of Nucleation Rate in Size Control of CoPt3 Nanocrystals," Journal of the Americal Chemical Society, 125 (2003), pp. 9090-9101.*

Hnin Yu Yu Ko and Takao Suzuki, "Self-Assembly and Magnetic Properties of FePt, FeRh Nanoparticles, and FePt/FeRh Nanocomposite Particles," IEEE Transactions on Magnetics, vol. 43, No. 2, Feb. 2007, pp. 885-887.*

(Continued)

*Primary Examiner* — Roy King
*Assistant Examiner* — Vanessa Velasquez
(74) *Attorney, Agent, or Firm* — Pamela A. Baxter; Kean Miller, LLP

(57) ABSTRACT

Disclosed herein are methods and processes for making FeRh/FePt nanostructures and the use of these FeRh—FePt nanostructures as a magnetic recording media.

2 Claims, 16 Drawing Sheets

U.S. PATENT DOCUMENTS

| | | |
|---|---|---|
| 6,599,646 B2 | 7/2003 | Suzuki et al. |
| 6,623,857 B2 | 9/2003 | Watanabe et al. |
| 6,834,026 B2 | 12/2004 | Fullerton et al. |
| 6,875,253 B2 | 4/2005 | Daimon et al. |
| 7,041,394 B2 | 5/2006 | Weller et al. |
| 7,147,916 B2 * | 12/2006 | Iwasaki et al. ............. 428/403 |
| 7,189,438 B2 | 3/2007 | Momose et al. |
| 7,274,626 B2 | 9/2007 | Kawato et al. |
| 7,381,239 B2 | 6/2008 | Waki et al. |
| 7,494,725 B2 | 2/2009 | Maeda et al. |
| 7,608,348 B2 | 10/2009 | Faehler |
| 2003/0108721 A1 | 6/2003 | Fullerton et al. |
| 2004/0084298 A1 | 5/2004 | Yao et al. |
| 2007/0048552 A1 | 3/2007 | Soeya |
| 2007/0292720 A1 | 12/2007 | Suess |
| 2008/0074776 A1 | 3/2008 | Soeya |

OTHER PUBLICATIONS

M. Shamsuzzoha, Shifan Shi, P. Padhan, David E. Nikles, and J.W. Harrell, "FePt(core)/FeRh(shell) Nanoparticles: Structure and Magnetism," Microscopy and Microanalysis (2008), 14 (Suppl 2), pp. 220-221.*

H.Y.Y. Ko, T. Suzuki, N. T. Nam, N.N. Phuoc, J. Cao, Y. Hirotsu, "Magnetic and structural characterizations on nanoparticles of FePt, FeRh and their composites," Journal of Magnetism and Magnetic Materials, 320 (2008), pp. 3120-3123, available online Aug. 22, 2008.*

Z. Jia, N. N Seetala, R.D.K. Misra, "Magnetic behavior of chemically synthesized FePt-FeRh nanostructures," Physica B, 405 (2010), pp. 2189-2193.*

* cited by examiner

FIGURE 4
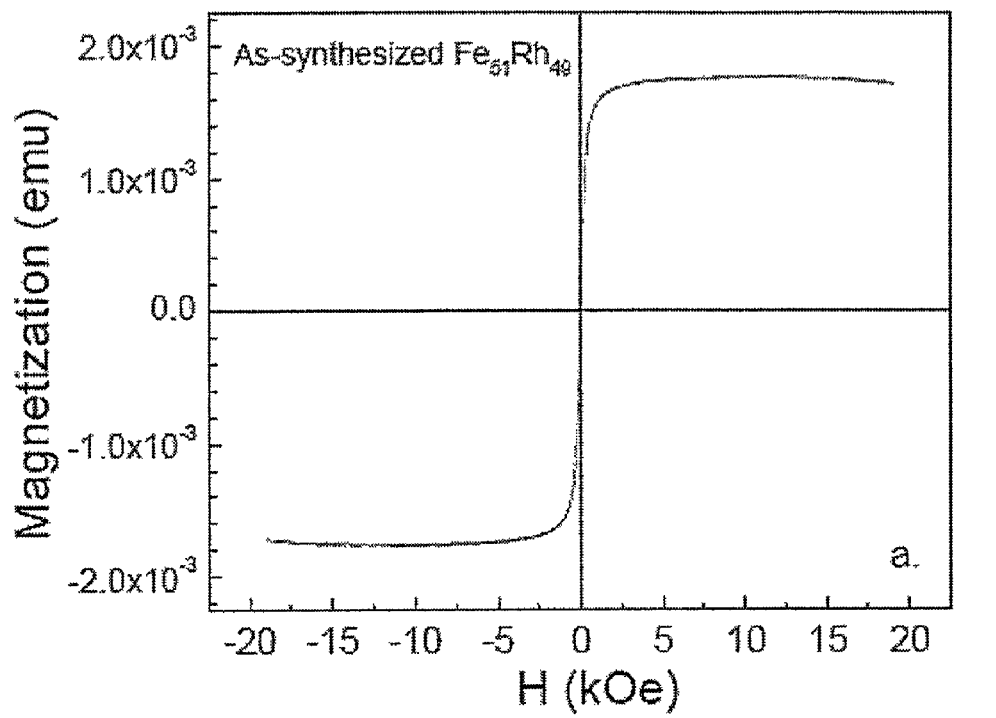
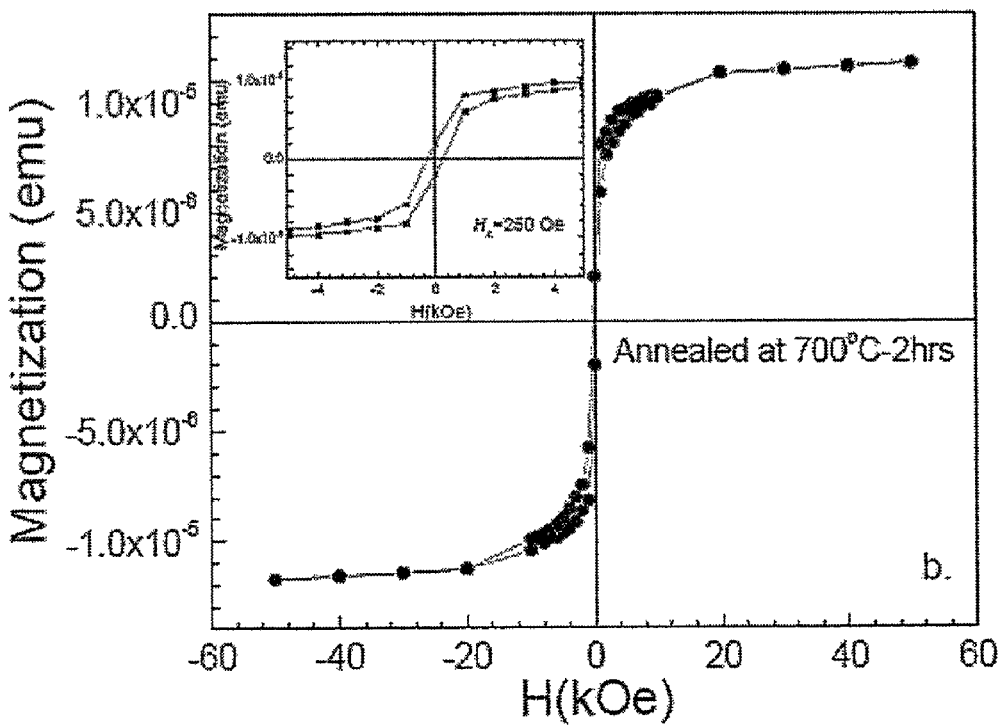

FIGURE 5
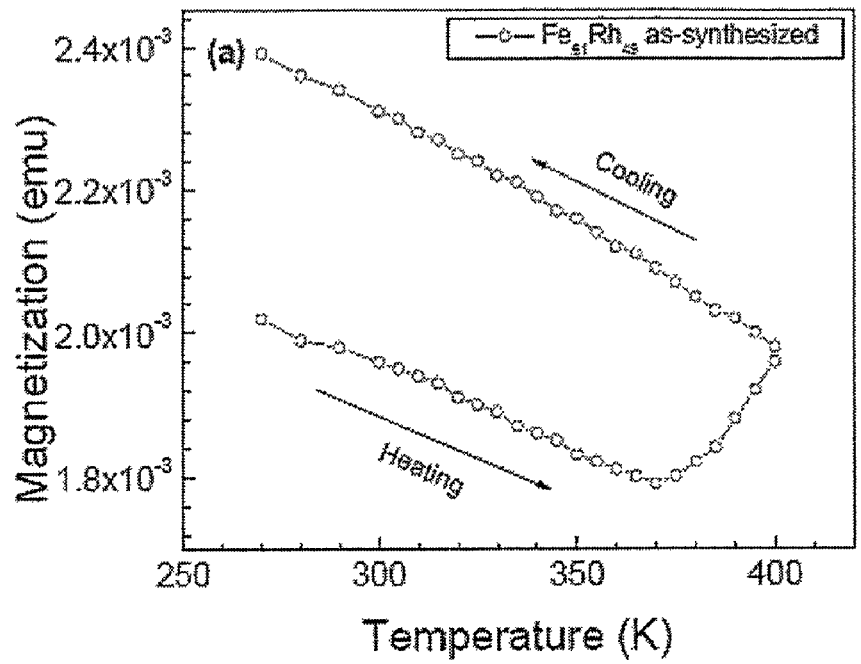
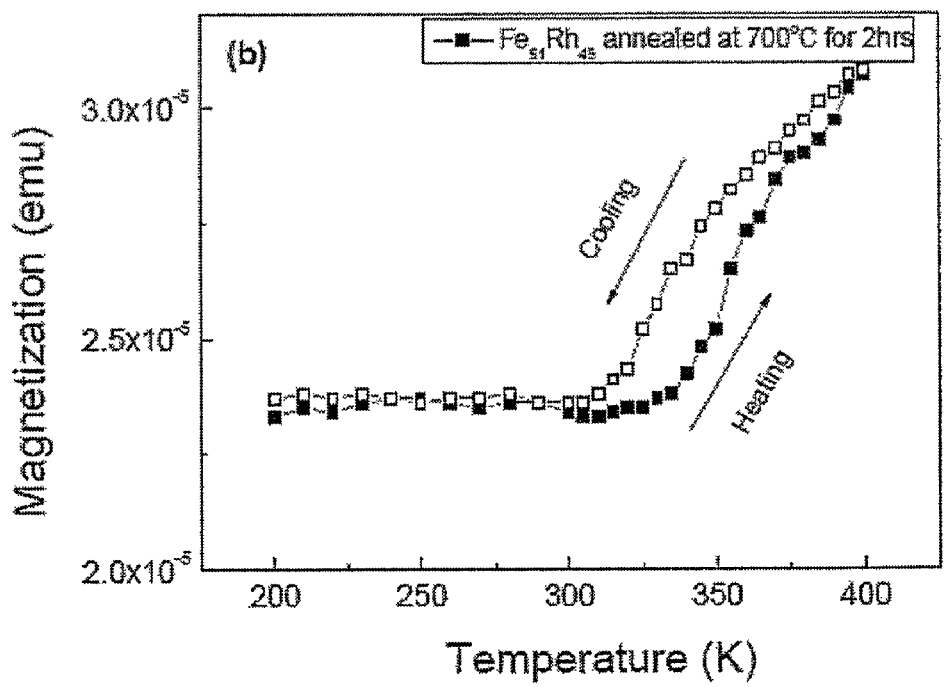

FIGURE 8(a). Flow chart for making partially ordered FePt
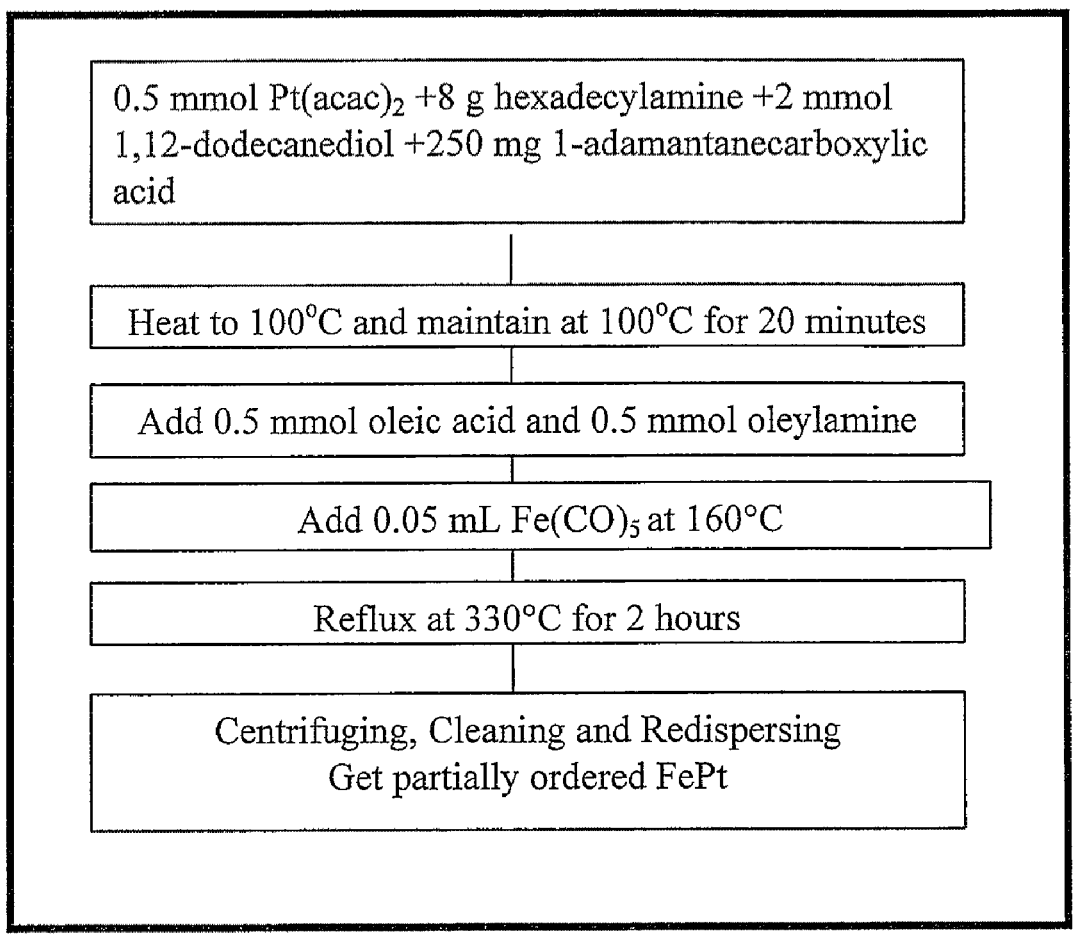

FIGURE 8(b). Flow chart for making partially ordered FePt-FeRh core-shell structure where partially ordered FePt is the core with encapsulating FeRh
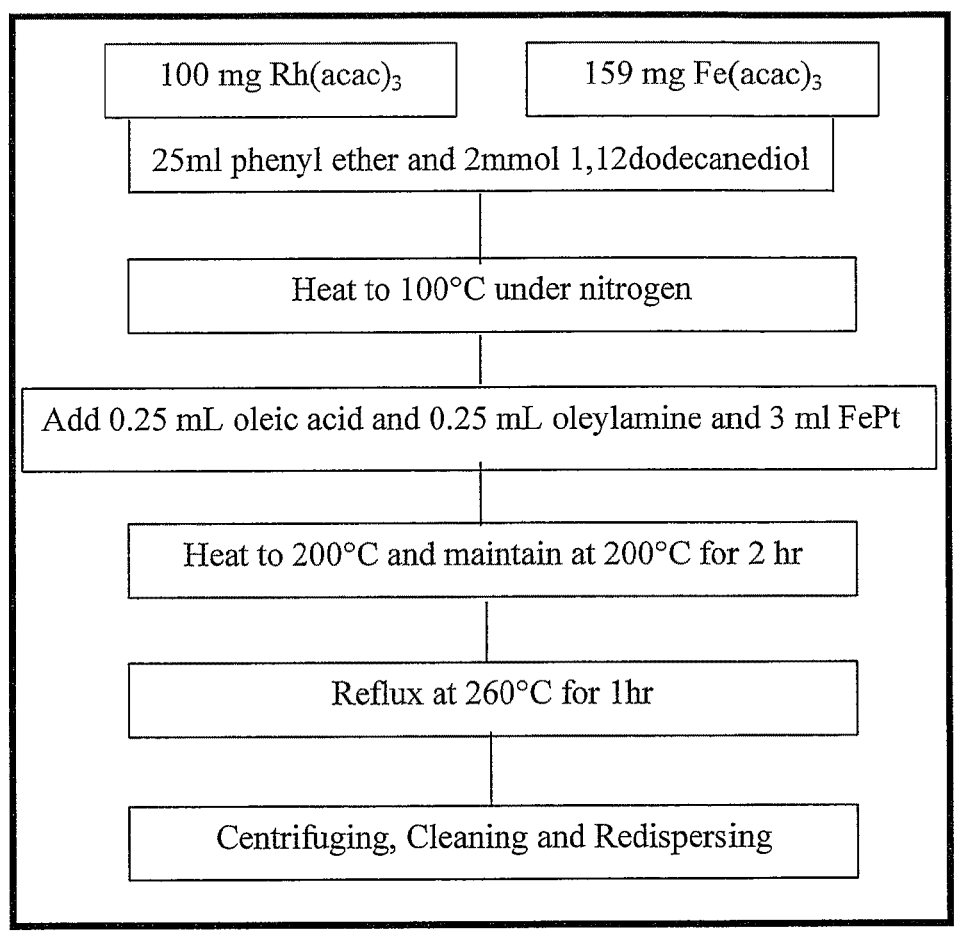

FIGURE 11
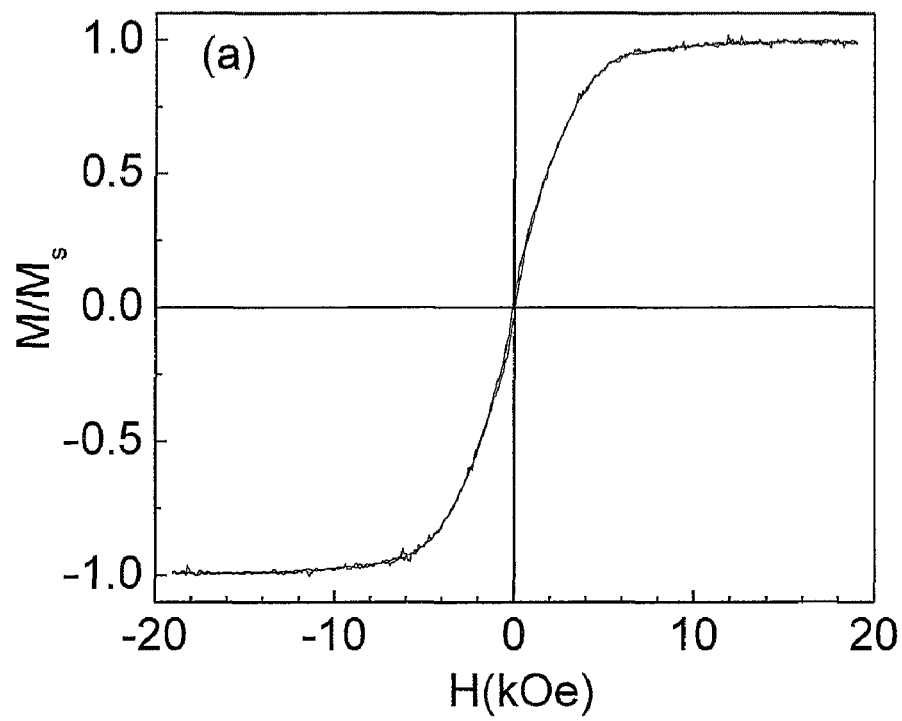
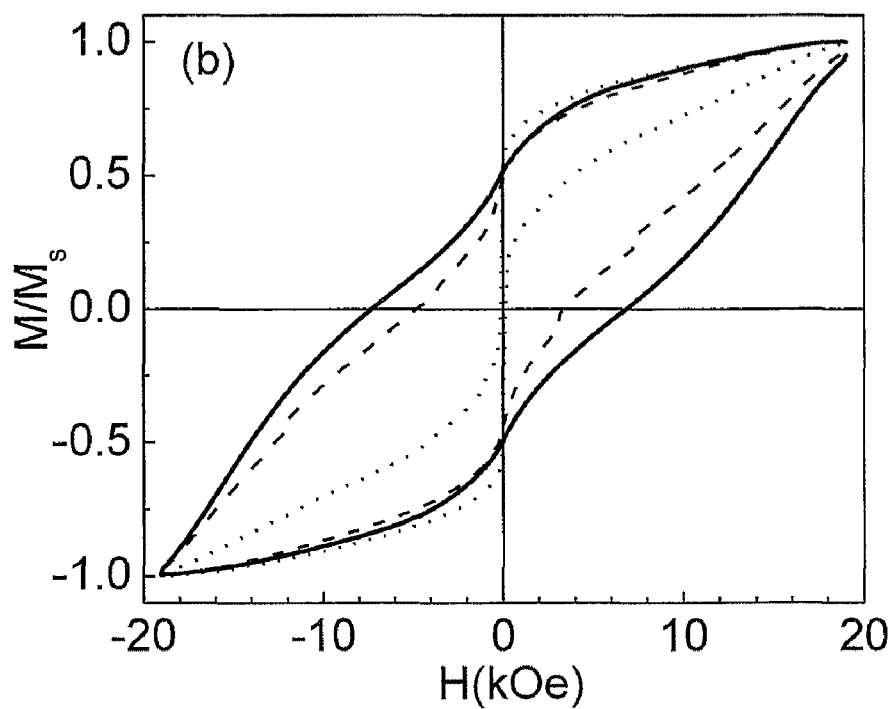

FERH-FEPT CORE SHELL NANOSTRUCTURE FOR ULTRA-HIGH DENSITY STORAGE MEDIA

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BRIEF DESCRIPTION OF THE DRAWINGS

FIG. 4 depicts the hysteresis loops of 20 nm $Fe_{51}Rh_{49}$ nanoparticles (a) as synthesized and (b) after annealing.

FIG. 5 depicts graphs showing that at an applied field of 10 kOe, the magnetization of (a) as prepared $Fe_{51}Rh_{49}$ nanoparticles and (b) $Fe_{51}Rh_{49}$ nanoparticles annealed at 700° C. for 2 hours, are dependent on temperature.

FIG. 8(a) is a flow chart for making partially ordered FePt.

FIG. 8(b) is a flow chart depicting the process for making partially ordered FePt—FeRh nanostructures, wherein partially-ordered ferromagnetic FePt nanoparticle cores are encapsulated with FeRh.

FIG. 11 depicts the hysteresis loops of (a) as-synthesized FeRh—FePt nanoparticles and (b) annealed FeRh—FePt nanoparticles.

DETAILED DESCRIPTION OF THE INVENTION

Figure 1A:
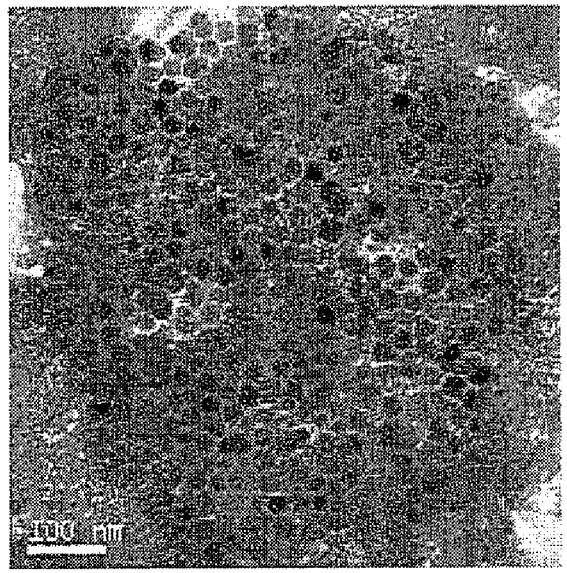
FIG. 1(a) is a transmission electron micrograph (TEM) of $Fe_{51}Rh_{49}$ nanoparticles with 1 mL of surfactant (oleic acid and oleylamine).

Fully ordered iron-platinum (FePt) systems cannot be used as a magnetic media because it cannot be written to by conventional recording heads because the coercivity of the recording heads is much lower than the coercivity of fully ordered FePt. FePt has both a high anisotropy and a coercivity (around 50 to 100 kOe) when it is in its fully ordered state. Currently, a writing magnetic field can only write to magnetic recording media having a coercivity up to 20 kOe.

Thermal fluctuation is a phenomenon by which the recorded magnetic domain will reverse due to thermal decay over time, which results in the loss of the recorded information. The increase in storage density is limited by thermal instabilities when the magnetic energy per grain $K_uV$ ($K_u$ is the manetocrystalline anisotropy and V is the grain volume) becomes comparable with thermal energies $k_BT$ (the superparamagnetic limit). One way to overcome thermostability issues is to increase the coercivity or the magnetic anisotropy of the magnetic recording media.

The fully ordered $L1_0$ phase of FePt exhibits high magnetocrystalline anisotropy ($K_u \sim 7 \times 10^7$ ergs/cm$^3$) and enables the use of thermally stable nanoparticles of approximately 3-4 nanometers (nm) as the basic unit for recording. However, the FePt system cannot be used for writing by conventional recording heads because, as indicated above, the coercivity of the recording heads is much lower than the coercivity of fully ordered FePt. Therefore, while FePt has a high $K_u$ value, it cannot be written by conventional recording heads because the coercivity of fully ordered FePt is too high.

An additional problem in high density magnetic recording is the thermostability of the written information over long periods of time. This thermostability at a given temperature, T, can be evaluated via the ratio of the anisotropy energy to the thermal energy $K_uV/k_BT$, where $K_u$ is the uniaxial anisotropy constant, V is the particle (grain) volume and $k_B$ is the Boltzmann constant. The traditional approach uses an increase of $K_u$ to compensate for the small grain sizes required at high areal densities, but this inevitably leads to increasing the switching field (coercivity) of the magnetic media. In recording applications, the magnetic field which can be delivered by the write head is limited to approximately 10 kOe.

In heat assisted magnetic recording (HAMR), a high-power laser beam is used to heat the magnetic medium and to reduce the anisotropy and switching fields. The basic idea of the HAMR approach is to write bits of information at an elevated temperature lower than the Curie temperature, where the switching field is small, and store the information at room or slightly elevated temperature, where the thermostability ratio is high. To achieve significant areal density advantage, the use of high anisotropy intermetallics such as ordered $L1_0$ phase of the FePt have been suggested. However, the very large anisotropy of FePt requires a very high writing temperature. Very high writing temperature heating also leads to other problems (laser beam delivery, lubricant stability, etc.).

In HAMR, both the coercivity and saturation magnetization of FePt are lowered during the heating process. However, the lowering of saturation magnetization of FePt reduces the thermal stability of the FePt media and therefore the ability of the FePt media to maintain written data over time. By magnetically coupling FePt with FeRh, the saturation magnetization of the FeRh—FePt system is increased over that of FePt alone, resulting in an increase in the thermal stability of the magnetic recording media and solving the write-ability problem.

FeRh belongs to the class of materials with a metamagnetic transition. At room temperature, $Fe_xRh_{100-x}$ alloy (x~50) is antiferromagnetic and transforms to the ferromagnetic state at approximately 300-400 K, depending on the chemical composition of the alloy (i.e., value of x). Given that FeRh is ferromagnetic and magnetically soft at elevated temperature, it can be magnetically coupled to FePt such that the antiferromagnetic (AF) to ferromagnetic (FM) transition temperature of FeRh can be exploited to lower the anisotropy of the coupled system. This can be realized by locally heating the media and lowering the switching field via an exchange spring mechanism during writing, overcoming write field limitations in both longitudinal and perpendicular magnetic recording. Thus, FePt and FeRh with similar lattice parameters ($a_{FePt}$=0.38 nm, $a_{FeRh}$=0.30 nm) can be grown without significant strain at the FeRh—FePt interface, where the antiferromagnetic nature of FeRh also increases thermal stability.

Bulk FeRh undergoes a first order antiferromagnetic (AF) to ferromagnetic (FM) transition between 50 and 100° Celsius (C.), depending on the composition, while retaining a high saturation magnetization comparable to that of FePt. By magnetic coupling between FePt and FeRh at AM-FM transition temperatures of FeRh, the coercivity of FePt is lowered. Lowering the coercivity of FePt by magnetic coupling of FePt and FeRh allows writing to FePt media with conventional recording head. This is accomplished through local heating of the FeRh—FePt media during writing, which lowers the coercivity and overcomes the write field limitation in magnetic recording using FePt media. Therefore the synthesis of FeRh nanoparticles and the magnetic coupling of these FeRh nanoparticles with FePt overcomes the write field limitations in both longitudinal and perpendicular magnetic recordings.

Figure 13:
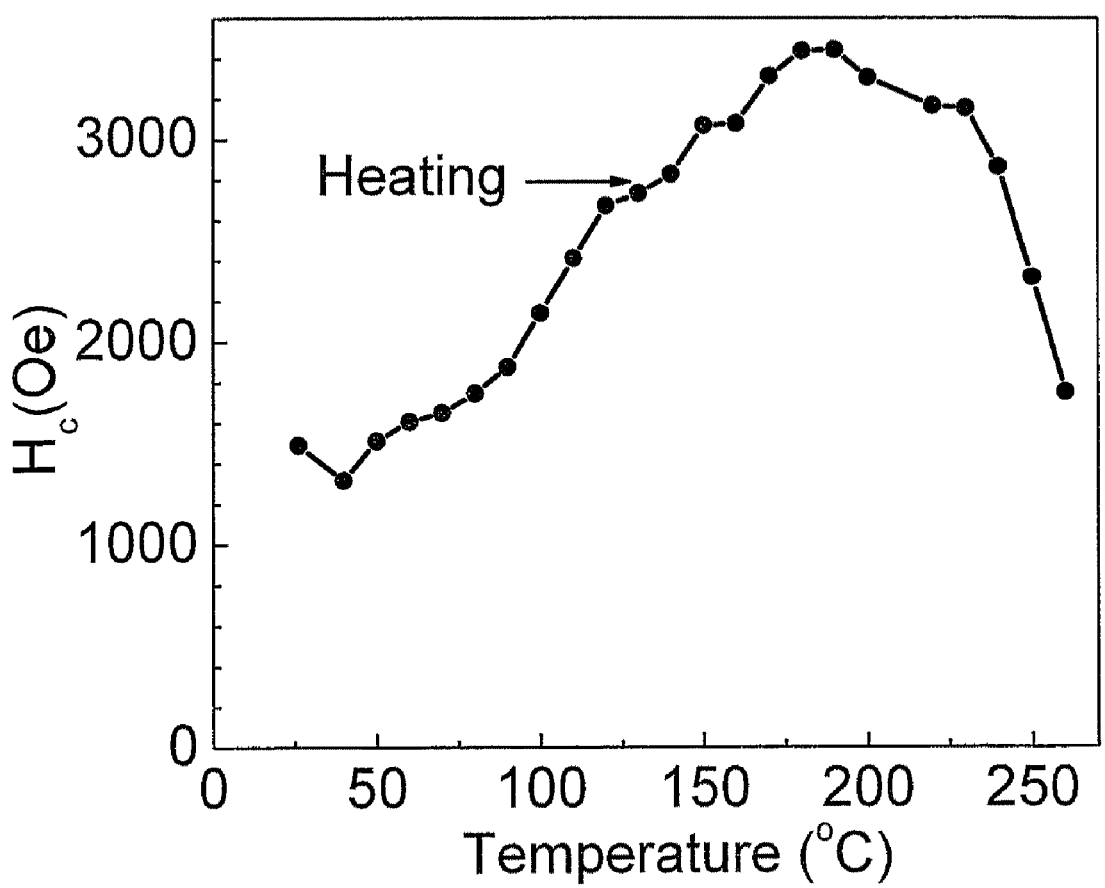
FIG. 13 shows the temperature-dependent coercivity in FeRh—FePt encapsulation annealed at 600° C. for 3 hr.

The coercivity of FePt nanoparticles annealed at 600° C. is in the range of 20 kOe. FeRh nanoparticles have a room-temperature coercivity of 250 Oe after annealing at 700° C. for 2 hours. Accordingly, use of a FeRh—FePt nanocomposite as a magnetic recording media both increases the thermal stability of the media and decreases the coercivity of the media when the media is heated to temperatures beyond 175° C., as shown in FIG. 13.

Monodisperse FeRh—FePt nanostructures were synthesized using a two-step chemical co-reduction and precipitation process. The first step is the production of FeRh nanoparticles through the reduction of iron (III) acetylacetonate [$Fe(acac)_3$] and rhodium (III) acetylacetonate [$Rh(acac)_3$] in the presence of surfactants and phenyl ether. The synthesized FeRh nanoparticles were dispersed in hexane. The FeRh nanoparticles were then encapsulated with FePt by adding the FeRh nanoparticles to a mixture of iron chloride, platinum acetylacetonate 1,12-dodecanediol, surfactants, and phenyl ether. A strong reducing agent was then added to the solution. The solution was refluxed and then cooled several times. Finally, the resulting FeRh—FePt nanoparticles were annealed in a ball-milled salt matrix. By encapsulating FeRh nanoparticles with FePt, the FeRh—FePt system can be used for ultra-high density recording media. FeRh—FePt nanoparticle structures facilitate the use of high magnetocrystalline FePt and allow the media to be writable using currently available head technology.

One embodiment of the invention includes synthesizing $Fe_xRh_{100-x}$ (x=35, 44, 51) nanoparticles with controlled composition and size (ranging from 4-20 nm). In an additional embodiment, the FeRh—FePt nanostructures ranged in size from approximately 4 nm to approximately 20 nm.

FeRh nanoparticles with both controllable composition and size were created. The composition of the FeRh nanoparticles was controlled by altering the ratios of the precursors iron acetylacetonate [$Fe(acac)_3$] and rhodium acetylacetonate [$Rh(acac)_3$]. The size of the FeRh nanoparticles was controlled by using high volume surfactants such as oleic acid and oleylamine. $Fe_xRh_{100-x}$ (x=35, 44, 51) nanoparticles around 4-20 nm in size were fabricated using a chemical polyol co-reduction process. The stoichiometry of $Fe_xRh_{100-x}$ nanoparticles was altered by tuning the molar ratio of rhodium acetylacetonate and iron acetylacetonate. The particle size was tunable via control of the surfactant concentration. The coercivity of $Fe_{51}Rh_{49}$ nanoparticles was approximately 250 Oe at room temperature after annealing at 700° C. for 2 hours, indicating a CsCl-type phase transition. The temperature dependent magnetization measurement of annealed $Fe_{51}Rh_{49}$ confirmed the antiferromagnetic-ferromagnetic transition and was supported by X-ray diffraction measurements.

Alternatively, nanostructures were made wherein partially ordered FePt cores are encapsulated with FeRh. First, the partially ordered ferromagnetic FePt nanoparticle cores are synthesized. The synthesis of partially ordered FePt nanoparticles involves the thermal decomposition of iron pentacarbonyl ($Fe(CO)_5$) and platinum acetylacetonate ($Pt(acac)_2$) in a high boiling point solvent hexadecylamine in the presence of adamantanecarboxylic acid. The experiments were carried out using standard airless procedures. After cooling, the product was precipitated with ethanol or hexane. Then the mixture was centrifuged to isolate the particles from the supernatant. The final product, partially ordered FePt, was dispersed in hexane with oleic acid and oleylamine.

Then the FePt was encapsulated with FeRh. Iron (III) acetylacetonate and rhodium (III) acetylacetonate were mixed in phenyl ether with 1,12-dodecanediol (2.0 mmol, 400 mg) in the presence of oleic acid and oleylamine. The synthesis was carried out in a nitrogen atmosphere. Subsequently, the pre-prepared partially ordered FePt nanoparticles were added to the solution. This was followed by increasing the temperature of the solution to reflux. After the synthesis, the product solution was cooled to room temperature. The precipitation and purification processes were repeatedly carried out a minimum of 3-4 times, and the final product FePt—FeRh core-shell nanostructure was finally dispersed in hexane.

The use of Hexadecylamine (HDA) (solvent) combined with 1-adamantanecarboxylic acid (ACA) during the creation of the FePt nanoparticle cores results in a high refluxing temperature of approximately 330° C. This yields partially-ordered FePt with coercivity of several thousand Oe. This partially-ordered FePt has a lower annealing temperature when the FePt—FeRh core-shell nanostructures are annealed in salt-matrix. Additionally, this may prevent or reduce the agglomeration and sintering in the annealing process. FIG. 8(a) is a flow chart for making partially ordered FePt. FIG. 8(b) is a flow chart depicting the process for making FePt—FeRh nanostructures, wherein partially-ordered ferromagnetic FePt nanoparticle cores are encapsulated with FeRh.

EXAMPLE 1

Monodisperse FeRh nanoparticles were synthesized using a chemical polyol co-reduction process involving reduction of iron (III) acetylacetonate [$Fe(acac)_3$] and rhodium (III) acetylacetonate [$Rh(acac)_3$] using 1,12-dodecanediol in the presence of oleic acid, oleylamine, and phenyl ether (25 ml). The synthesis was carried out in a nitrogen atmosphere and the temperature of the mixed constituents was increased to 100° C. for 10 minutes to ensure that the precursors dissolved. Alternatively, an argon atmosphere may be used instead of nitrogen. Subsequently, the temperature was raised to 200° C. and maintained for 2 hours. This was followed by increasing the temperature of the solution to reflux at 260° C. for 1 hour. After the synthesis, the product solution was cooled to room temperature. The precipitation and purification processes were carried out at least three to four times, and the final product was finally dispersed in hexane. Structural characterization of particles was carried out using transmission electron microscopy (TEM) and X-ray diffraction (XRD). The magnetic properties were measured by the superconducting quantum interference device (SQUID) magnetometer for nanoparticle film annealed in oven at 700° C. for 2 hours.

EXAMPLE 2

A series of FeRh nanoparticles with different compositions was synthesized by changing the ratio of the precursors [Fe(acac)$_3$:Rh(acac)$_3$ ratio]. The 1.2 ratio of Fe(acac)$_3$:Rh(acac)$_3$ yielded 20 nm FeRh nanoparticles with the stoichiometric composition Fe$_{35}$Rh$_{65}$. The 1.8 ratio of Fe(acac)$_3$:Rh(acac)$_3$ yielded 20 nm FeRh nanoparticles with the stoichiometric composition Fe$_{51}$Rh$_{49}$. The intermediate 1.6 ratio of Fe(acac)$_3$:Rh(acac)$_3$ yielded 20 nm FeRh nanoparticles with the stoichiometric composition of Fe$_{44}$Rh$_{56}$.

EXAMPLE 3

Figure 1B:
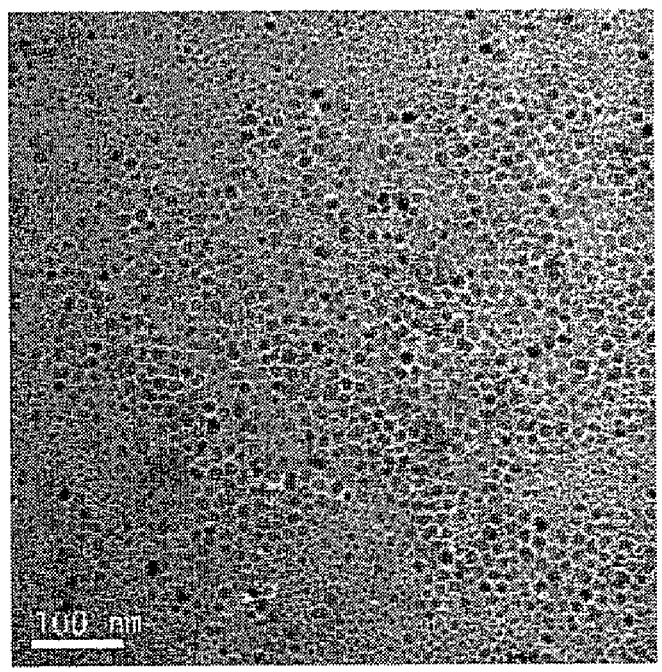
FIG. 1(b) is a transmission electron micrograph (TEM) of $Fe_{51}Rh_{49}$ nanoparticles with 0.5 mL of surfactant (oleic acid and oleylamine).
Figure 1C:
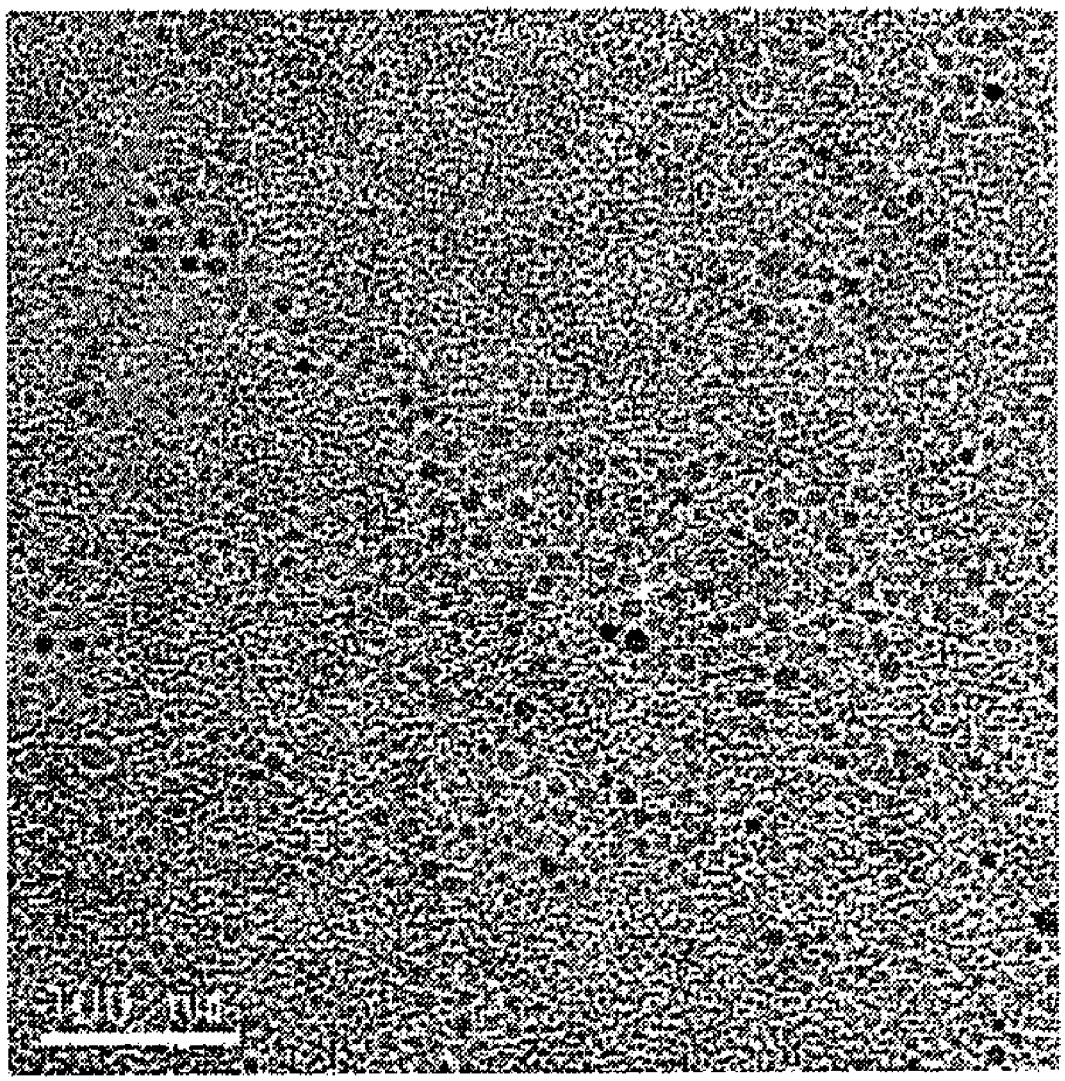
FIG. 1(c) is a transmission electron micrograph (TEM) of $Fe_{51}Rh_{49}$ nanoparticles with 0.25 mL of surfactant. (oleic acid and oleylamine).
Figure 2:
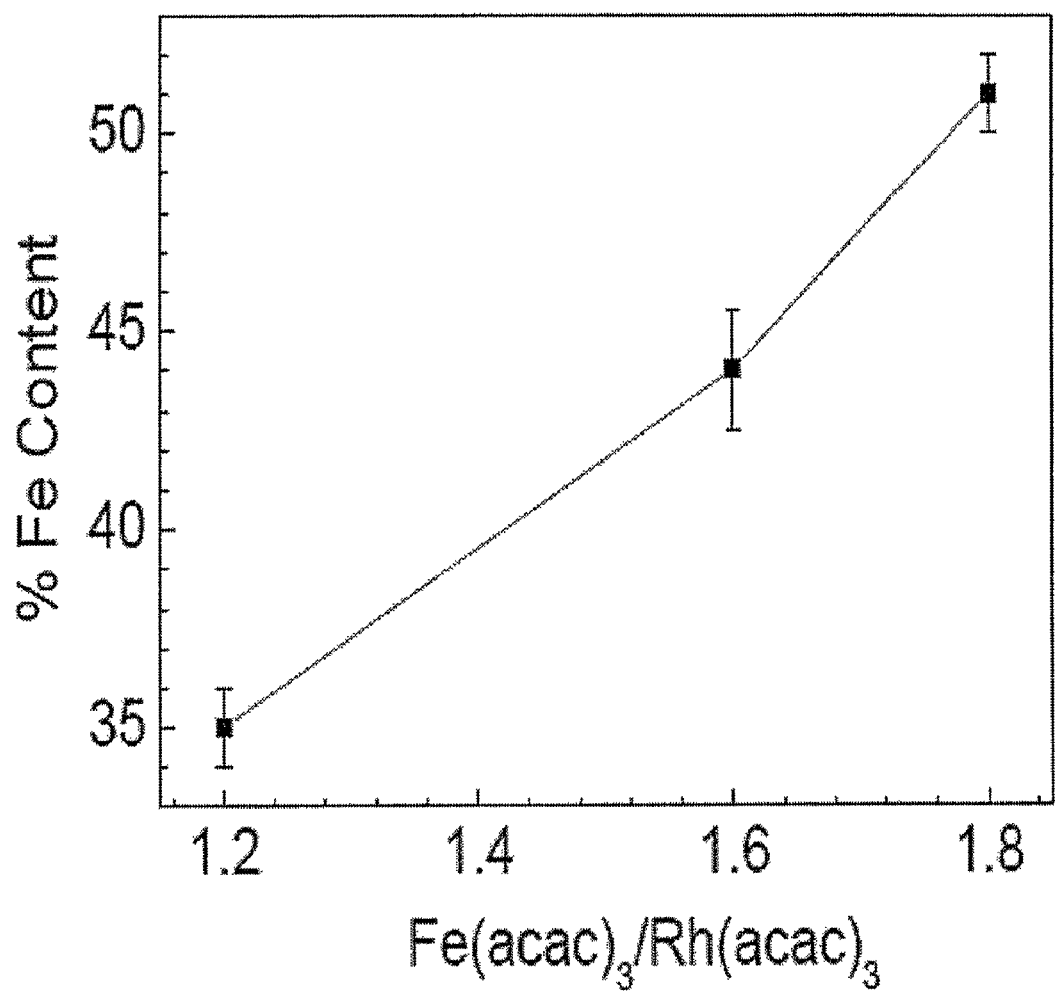
FIG. 2 is a graph showing how altering the ratio of iron acetylacetonate to rhodium acetylacetonate affects the iron content in the synthesized FeRh nanoparticles.

The size of the FeRh nanoparticles was controlled by using high volume surfactants such as oleic acid and oleylamine. 1 mL of oleic acid and 1 mL of oleylamine yielded an average Fe$_{51}$Rh$_{49}$ nanoparticle size of 20 nm, 0.5 mL of oleic acid and 0.5 mL of oleylamine yielded an average Fe$_{51}$Rh$_{49}$ nanoparticle size of 10 nm, and 0.25 mL of oleic acid and 0.25 mL of oleylamine yielded an average Fe$_{51}$Rh$_{49}$ nanoparticle size of 4 nm. The relation of the volume of the surfactant and the particle size is presented in FIGS. 1(a), 1(b), and 1(c). FIGS. 1(a), 1(b) and 1(c) are TEM images of as-synthesized Fe$_{51}$Rh$_{49}$ nanoparticles with different concentrations of surfactant oleic acid and oleylamine used in the synthesis process. The size distribution in the 20 nm and 10 nm FeRh nanoparticle images is narrow while the 4 nm one shows bimodal distribution. The molar ratio of Fe(acac)$_3$ and Rh(acac)$_3$ was maintained constant at 1.8 and the content of oleic acid and oleylamine was varied to obtain different nanoparticle sizes, as described above and shown in FIG. 2.

EXAMPLE 4

Figure 3:
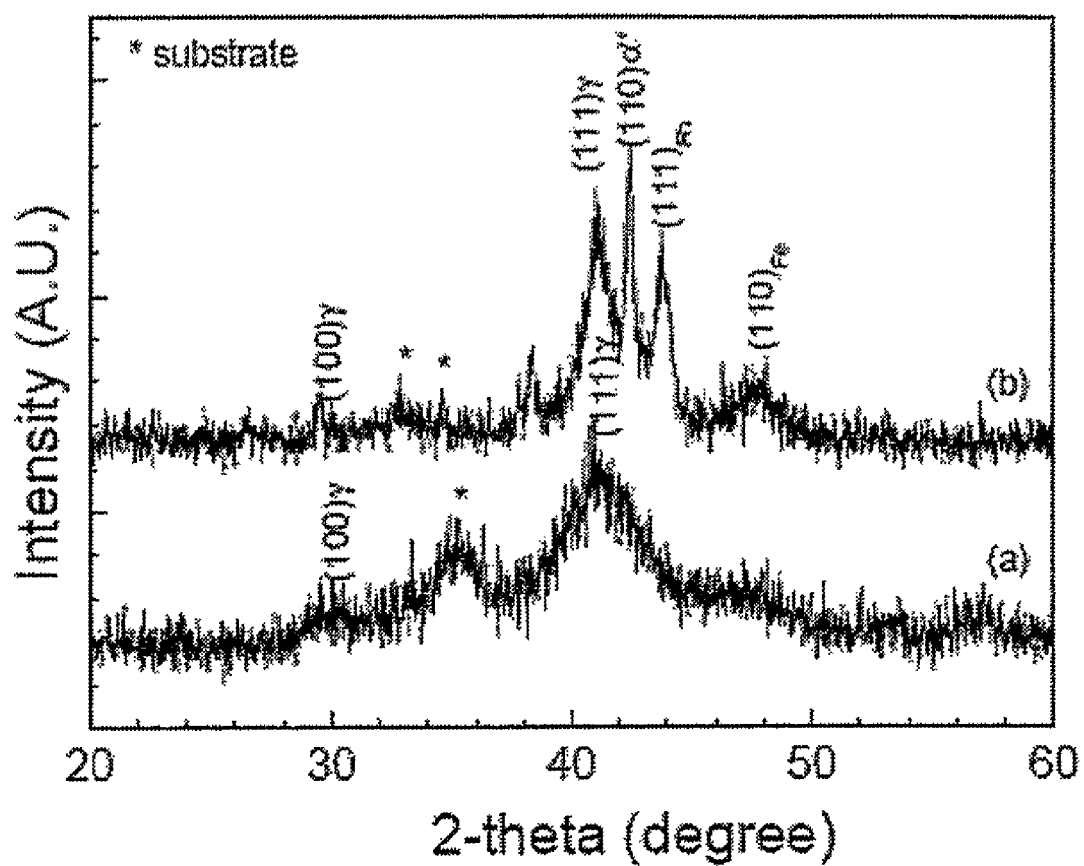
FIG. 3 depicts X-ray diffraction patterns of 4 nm $Fe_{51}Rh_{49}$ nanoparticles (a) as-prepared, and (b) annealed for 2 hours at 700° C.

XRD analysis of Fe$_{51}$Rh$_{49}$ nanoparticles is presented in FIG. 3. The XRD pattern of as-synthesized 4 nm Fe$_{51}$Rh$_{49}$ nanoparticles shows the (100) and (111) peaks of chemical-disordered γ-FeRh phase (fcc). On annealing at 700° C. for 2 hours, the (110) peak of the chemically ordered FeRh in the XRD pattern indicated partial transformation of γ-FeRh phase to the α"-FeRh phase (bcc), which is antiferromagnetic. The (110) peak indicates the CsCl-type structure (α"-FeRh) formation, while the presence of (100) and (111) peaks of γ-FeRh suggests that FeRh is not completely transformed into α"-FeRh. The appearance of the Rh (111) peak and the Fe (110) peak presumably implies the partial precipitation of the parent elements from the FeRh alloy.

EXAMPLE 5

The hysteresis loop for as-synthesized and annealed (700° C. for 2 hours) Fe$_{51}$Rh$_{49}$ nanoparticles measured at room temperature (300 K) is presented in FIG. 4. The coercivity (H$_c$) of as-deposited FeRh nanoparticles was very small and nearly zero, while coercivity of annealed Fe$_{51}$Rh$_{49}$ nanoparticles was approximately 250 Oe. This increase is most likely because of the increase of particle size on annealing.

EXAMPLE 6

FIG. 5 presents the magnetization as a function of temperature for Fe$_{51}$Rh$_{49}$ nanoparticles at an applied field of 10 kOe for as-synthesized and annealed (700° C. for 2 hours) samples. In the case of as-synthesized Fe$_{51}$Rh$_{49}$ nanoparticles, during the heating process, the magnetization decreased from 270 K and reached the minimum at 370 K followed by an increase up to 400 K. While on cooling from 400 K to 270 K, the magnetization continuously increased during the cooling process. The decrease in magnetization during the heating process until 370 K is typical for superparamagnetic materials. Subsequently, the AF α"-FeRh might transform into FM α'-FeRh (bcc). This FM α'-FeRh contributed to the increase of the magnetization between 370 K and 400 K. This phase transition is not reversible in the cooling process over the temperature range of the measurements. On cooling, the magnetization of superparamagnetic γ-FeRh and FM α'-FeRh increases continuously from 400 K to 270 K in a manner similar to superparamagnetic material and ferromagnets. The higher total magnetization during the cooling process than during the heating process is attributed to the retention of the α'-FeRh.

In contrast, the annealed Fe$_{51}$Rh$_{49}$ nanoparticles exhibited a distinct antiferromagnetic to ferromagnetic transition during both the heating and cooling processes. There is temperature hysteresis observed on the magnetization versus temperature plot in a constant in-plane field of 10 kOe. The temperature range is larger at lower magnetization and smaller at higher magnetization for FeRh nanoparticles. Furthermore, the phase transition occurred over a wider range of temperature compared to that of thin film FeRh samples. It is noted that the magnetization of annealed FeRh is not zero below the transition temperature. The XRD pattern shows the (110) peak of iron in the annealed FeRh. The magnetization below transition temperature is relatively large.

EXAMPLE 7

The chemical synthesis of FeRh—FePt nanostructures were fabricated using a two-step procedure. The first step involved chemical synthesis of FeRh nanoparticles using a polyol co-reduction process followed by the second stage of encapsulation with FePt. The FeRh—FePt nanoparticles were subsequently annealed in a salt matrix at 600° C. for 3 hours. Magnetic measurements were then made for films of the FeRh—FePt nanostructures cast onto silicon wafers before and after the salt matrix annealing. The coercivity of as-synthesized FeRh—FePt nanostructures was approximately 70 Oe at room temperature, while the coercivity of salt-matrix annealed FeRh—FePt nanoparticles was approximately 7065 Oe. The temperature dependent magnetization measurement of annealed FeRh—FePt nanostructures indicated the antiferromagnetic-ferromagnetic transition, supported by x-ray diffraction measurements.

Synthesis of FeRh nanoparticles. 100 mg of Rh(acac)$_3$ (0.25 mmol), 159 mg of Fe(acac)$_3$ (0.45 mmol), 402 mg of 1,12-dodecanediol (2.0 mmol) were mixed in 25 mL of diphenyl ether. The solution was then heated to 100° C. under a nitrogen atmosphere. 0.2 mL of oleic acid and 0.2 mL of oleylamine were added to the heated solution. Then the solution was heated to 200° C. and kept at 200° C. for 2 hours. Next, the solution was refluxed at 260° C. for 60 minutes to obtain particle dispersion. Then 40 mL of ethanol was added. Finally, the FeRh nanoparticles were isolated by centrifuging and sonicating.

Figure 6:
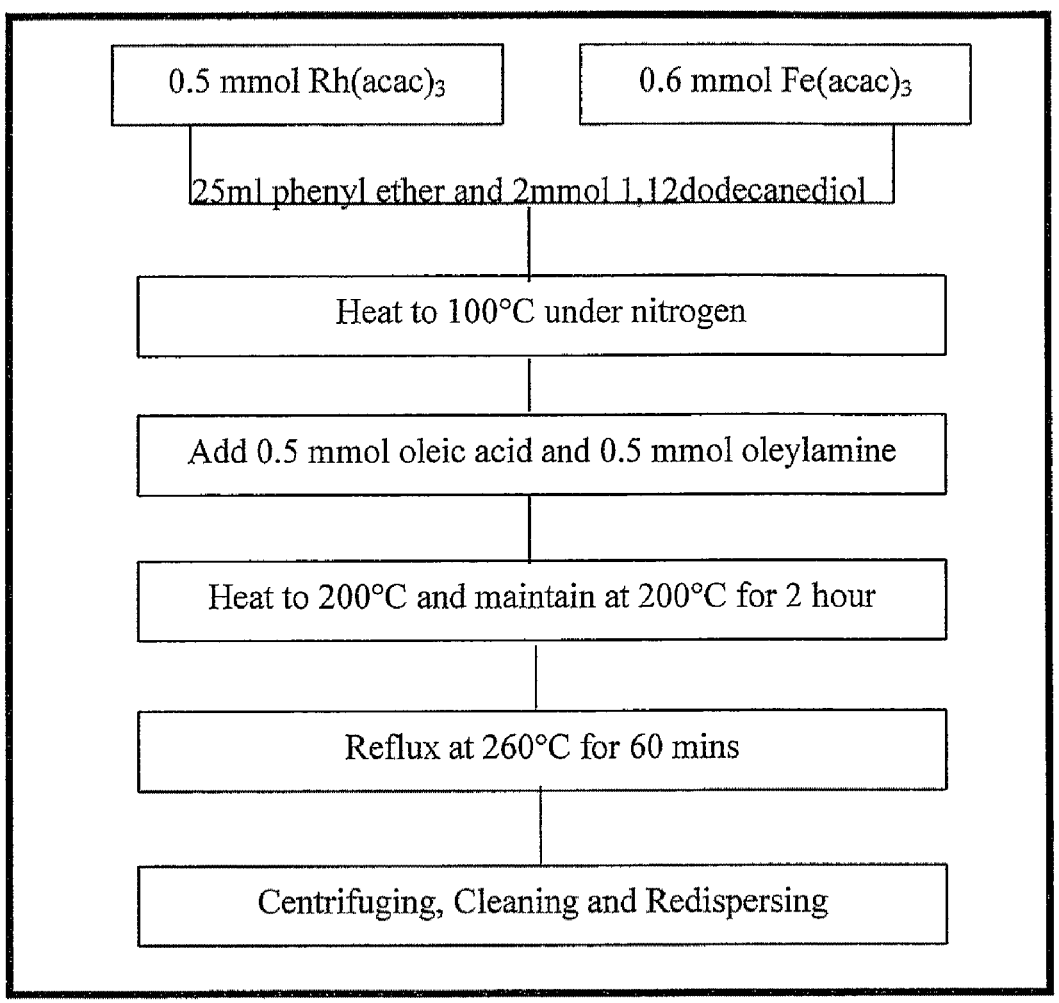
FIG. 6 is a flow chart depicting the process for synthesizing FeRh nanoparticles.
Figure 7:
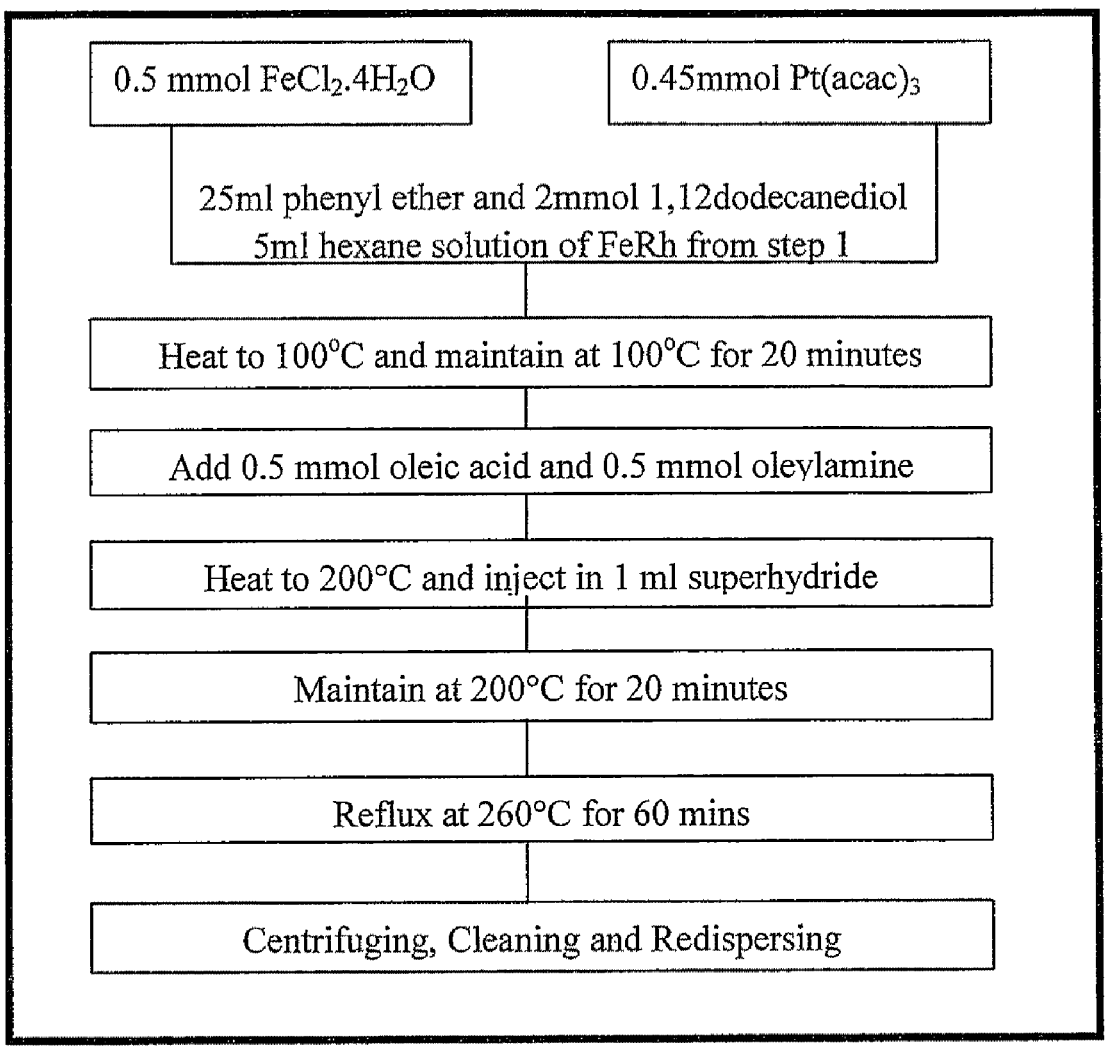
FIG. 7 is a flow chart depicting the process for synthesizing FeRh—FePt nanostructures, wherein FeRh nanoparticle cores are encapsulated with FePt.

FeRh encapsulation with FePt. 200 mg of Pt(acac)$_3$ (0.5 mmol), 110 mg of FeCl$_2$.4H$_2$O (0.55 mmol), and 400 mg of 1,12-dodecane diol (2 mmol) were mixed in 20 mL of diphenyl ether. Alternatively, hexadecylamine may be used as a solvent in place of diphenyl ether. The solution was then heated to 80° C. under nitrogen atmosphere. Then the as-synthesized FeRh solution (from above) was added to the mixed FePt precursor solution. The resulting solution was then heated to 100° C. under nitrogen atmosphere. 0.16 mL of oleic acid and 0.17 mL of oleylamine were then added to the solution. Next, the solution was heated to 200° C. Then 1 mL superhydride was injected to the solution and the solution was maintained at 200° C. for 20 minutes. Then the solution was refluxed at 260° C. for 60 minutes resulting in particle dispersion. 40 mL of ethanol was then added. Finally, the FeRh—FePt nanostructures were isolated by centrifuging. FIG. 6 is a flow chart depicting the process for synthesizing FeRh nanoparticles. FIG. 7 is a flow chart depicting the process for synthesizing FeRh—FePt nanostructures.

EXAMPLE 8

Monodisperse FeRh—FePt encapsulated nanostructures were synthesized using a two-step chemical co-reduction and precipitation process. The first step involved reduction of iron (III) acetylacetonate (Fe(acac)$_3$) and rhodium (III) acetylacetonate (Rh(acac)$_3$) using 1,12-dodecanediol in the presence of oleic acid, oleylamine, and phenyl ether as described above. Subsequently, the as-synthesized FeRh nanoparticles dispersed in hexane were added to a mixture of iron chloride, platinum acetylacetonate, 1,12-dodecanediol, and phenyl ether at 100° C. containing oleic acid and oleylamine. Next, the temperature was raised to 200° C. and 2 mL strong reducing agent of superhydride in tetrahydrofuran (TEF) was gradually added to the solution. The solution was maintained at 200° C. for 20 minutes to completely evaporate THF. This was followed by increasing the temperature of the solution at 260° C. for 1 hour to promote reflux. The obtained solution was then cooled to room temperature. The precipitation and purification process was repeated for a minimum of 3-4 times. The finally obtained product after centrifugation was re-dispersed in hexane.

Annealing of FePt—FeRh nanoparticles was carried out in a NaCl separating media that effectively inhibits particle growth and agglomeration because of its chemical stability and high solubility in water. NaCl was first ball-milled for 24 hours to reduce the particle size. The ball-milled NaCl powder was then dispersed in hexane, followed by mixing with the dispersion of as-synthesized FePt encapsulated FeRh nanoparticles. The dispersion was vigorously stirred until the solvent was completely evaporated, followed by annealing in reducing gas (Ar-5% H$_2$) at 600° C. to completely transform both FeRh and FePt into chemically-ordered phases. The annealed powders were washed in de-ionized water and centrifuged several times to remove NaCl. The final product was then redispersed in hexane for further examination by TEM.

Structural characterization of particles was carried out using transmission electron microscopy (TEM) and X-ray diffraction (XRD). The magnetic properties were measured by vibrating sample magnetometer (VSM) with temperature controller and alternating gradient field magnetometer (AGM).

Figure 9A:
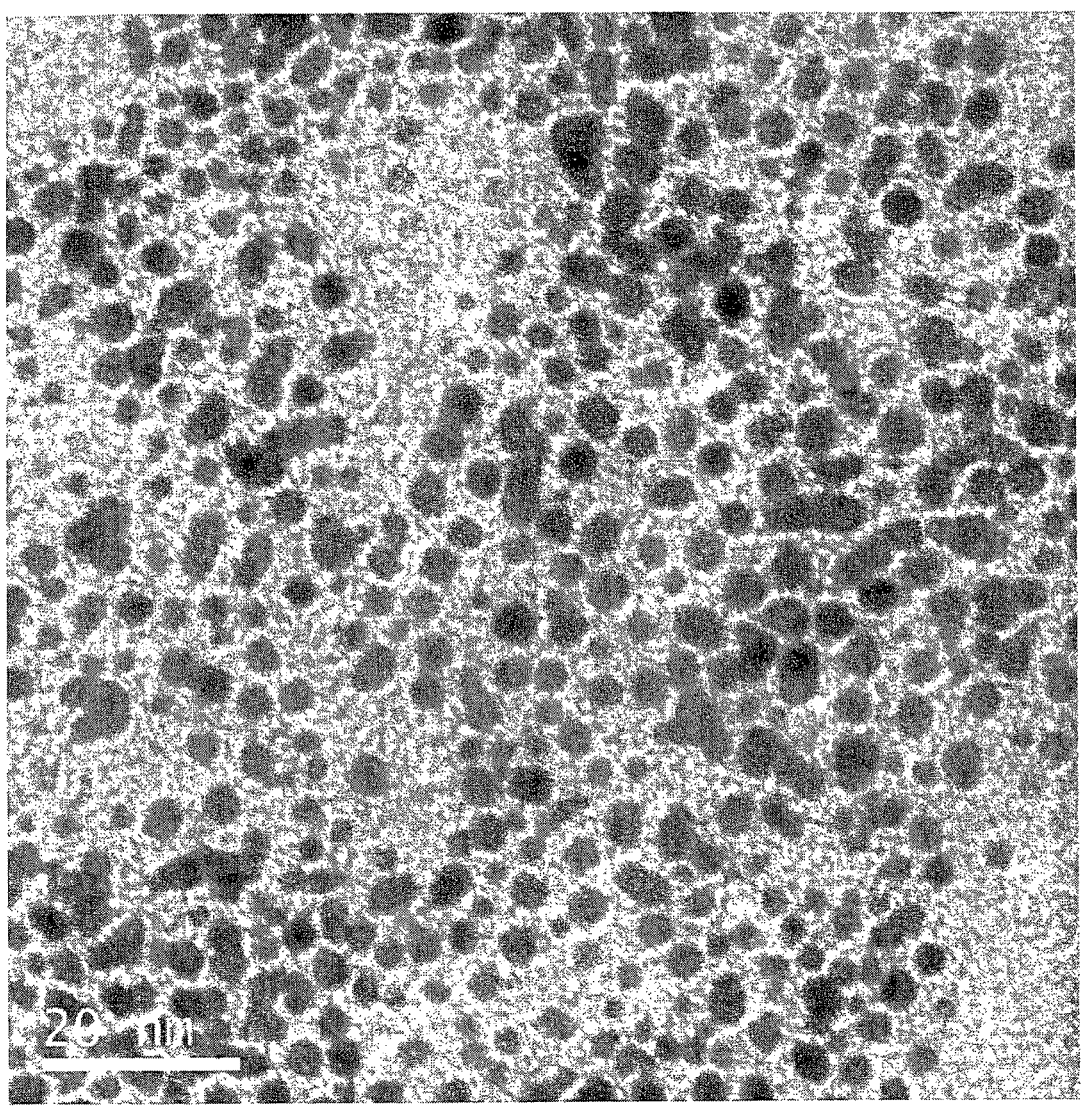
FIG. 9(a) is a transmission electron micrograph of as-synthesized FeRh—FePt nanoparticles.
Figure 9B:
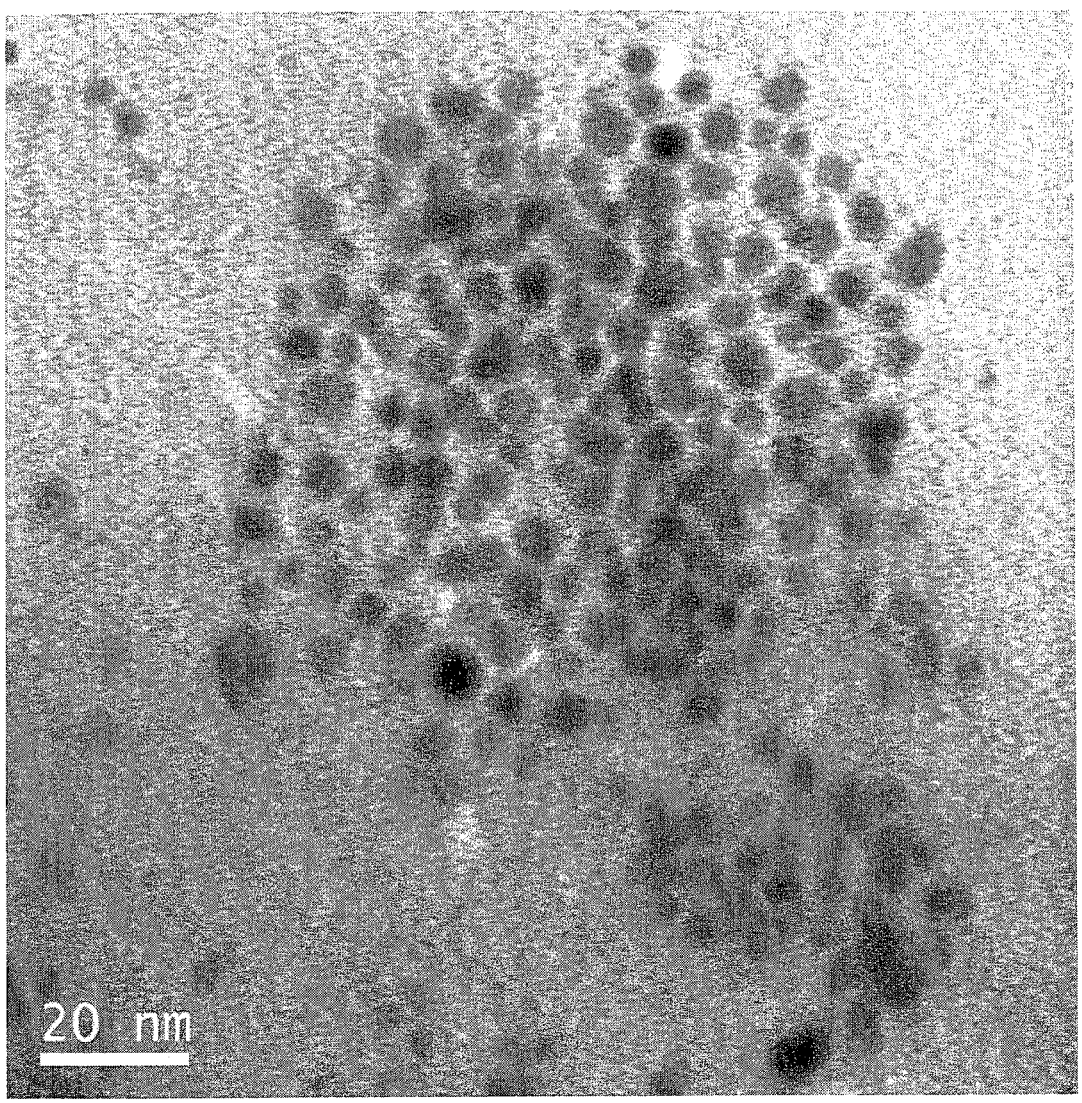
FIG. 9(b) is a transmission electron micrograph of salt-annealed FeRh—FePt nanoparticles.

The experimentally synthesized nanostructured system was annealed in the salt-matrix (see above) to allow the ordering of FeRh. TEM micrographs of FeRh—FePt nanostructure before and after annealing are presented in FIGS. 9(a) and 9(b). The size of as-synthesized FePt encapsulated FeRh nanoparticles was estimated to be approximately 4-5 nm. A close comparison of as-synthesized and annealed FeRh—FePt nanoparticle micrograph (FIGS. 9(a) and 9(b)) indicate a similar size implying that no obvious or significant growth occurred during annealing in NaCl media. The final diameter of FePt—FeRh nanoparticles can be altered by varying the ratio of the precursor and the surfactants as described above.

Figure 10:
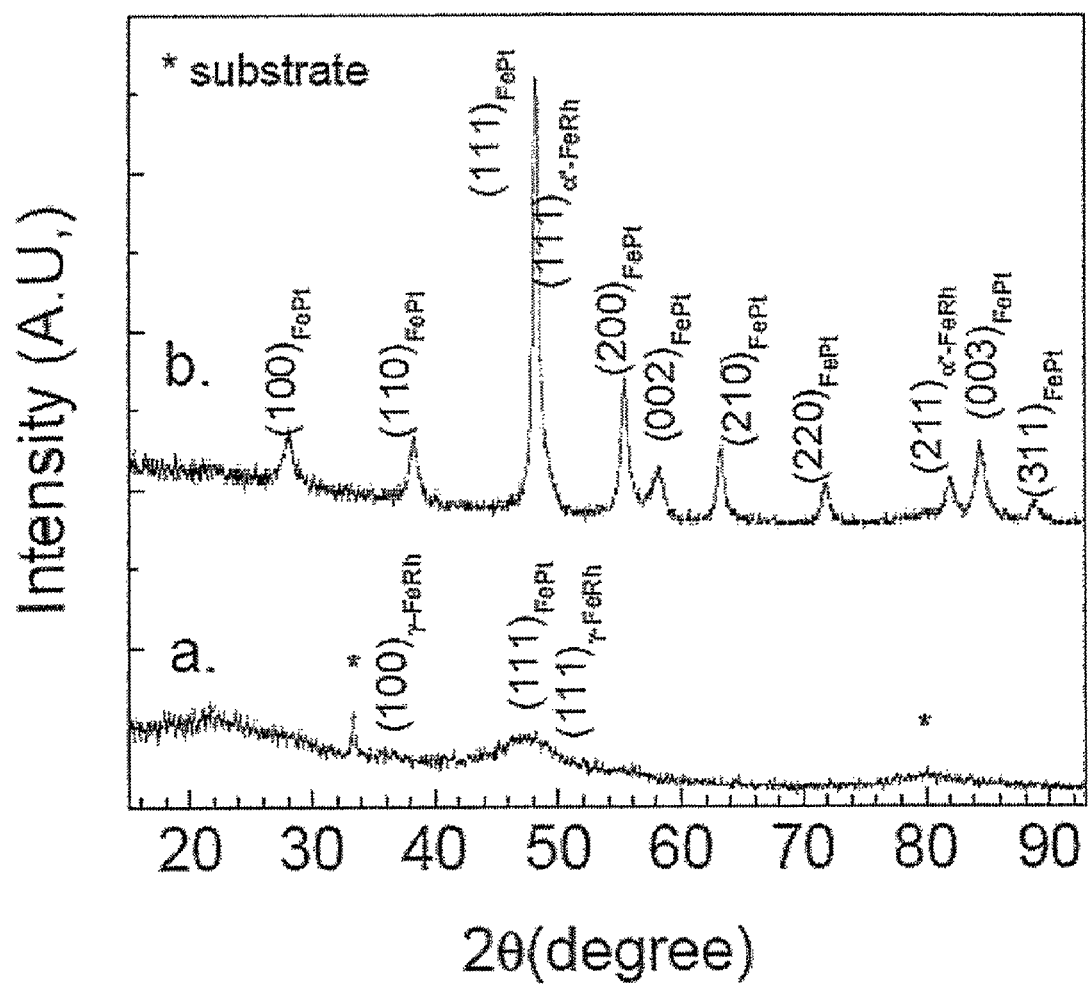
FIG. 10 depicts the X-ray diffraction patterns of FeRh—FePt nanoparticles (a) as-synthesized, and (b) annealed at 600° C. for 3 hours.

The X-ray diffraction pattern ($\lambda_{CoK\alpha}$=0.17889 nm) of as-synthesized and annealed FeRh—FePt nanostructures is presented in FIG. 10. In FIG. 10, the diffraction peaks of FePt and FeRh are identified. The XRD pattern of as-synthesized FeRh—FePt nanoparticles shows the characteristic peaks corresponding to face-centered cubic (fcc) FePt and FeRh. The (100) and (111) peaks are from the chemically-disordered γ-FeRh (fcc) phase, while the (111) and (200) peaks are from encapsulating fcc FePt. After salt-matrix annealing at 600° C. for 3 hours, the presence of the chemically ordered FeRh (110) peak in the XRD pattern indicates partial transformation of γ-FeRh phase to the α"-FeRh phase (2θ=48°, bcc), which is antiferromagnetic at room temperature. The (110) peak (2θ=48° and overlapped with (111) FePt peak) and (211) peak (2θ=83.8°) clearly indicates the CsCl-type structure (α"-FeRh) formation, while the presence of (100) and (111) peaks of t-FeRh suggests that FeRh is not completely transformed into α"-FeRh. The presence of (001) (2θ=27.9°) and (110) (2θ=38.3°) peaks along with the splitting of (200) (2θ=55.4°) and (002) (2θ=57.6°) peaks of the annealed FePt—FeRh XRD patterns confirm the phase transition fcc FePt into chemical ordered face-centered tetragonal (fct) FePt. On annealing, the different characteristic peaks of FePt and FeRh, which were suppressed because of the residual organic surfactant on the surface used during the chemical synthesis of nanoparticles, emerge and become sharp. This may also be attributed to some inter-diffusion during annealing.

The hysteresis loop for as-synthesized and annealed (600° C. for 3 hours) FeRh—FePt nanostructured system measured at room temperature is presented in FIG. 11. The coercivity ($H_c$) of as-synthesized FeRh/FePt nanoparticles was small at approximately 70 Oe, while the coercivity of annealed FeRh—FePt nanoparticles was approximately 7065 Oe. Furthermore, the squaredness of the loop after annealing was estimated to be approximately 0.5.

Figure 12:
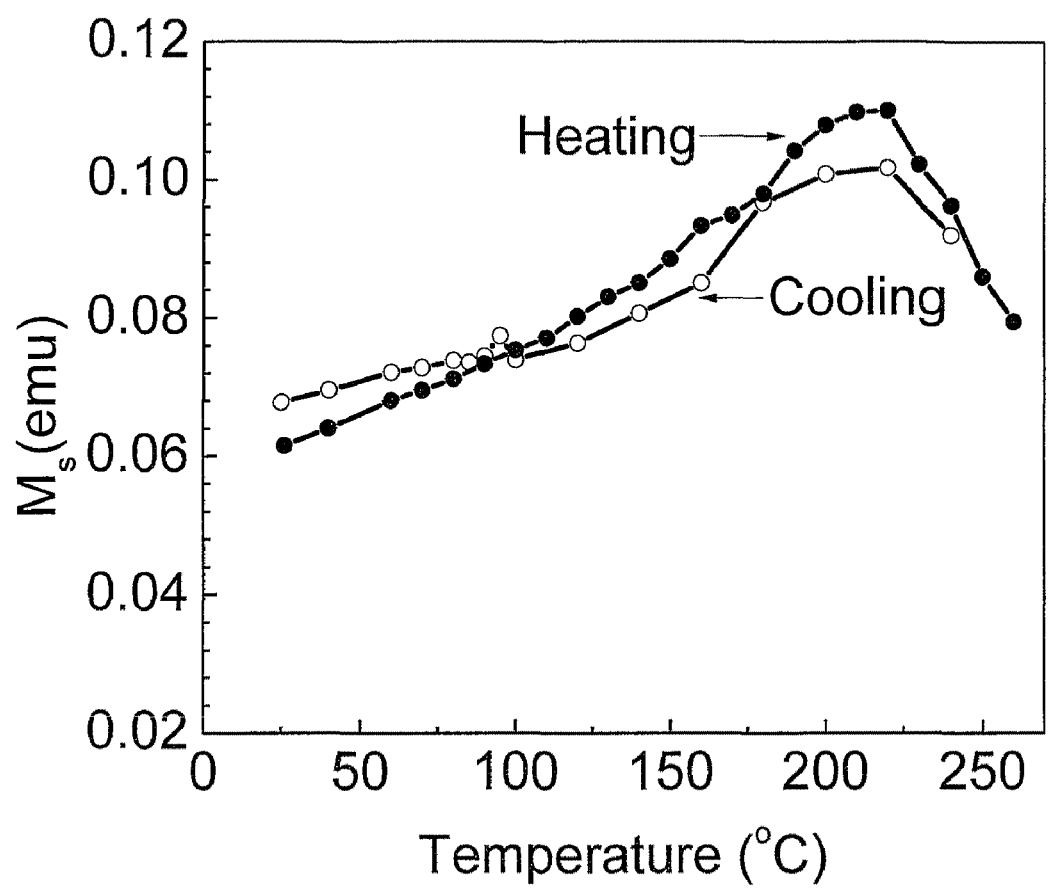
FIG. 12 is a graph depicting that the magnetization of the FeRh—FePt nanoparticle structured system, which is annealed at 600° C. for 3 hours, is dependent on temperature.

FIG. 12 illustrates the magnetization as a function of temperature for annealed FeRh—FePt nanoparticles. The hysteresis loops were measured from 30° C. to 260° C. and then from 260° C. to 30° C. with step size of 10° C. The maximum value of magnetization at applied field of 10 kOe was determined from the hysteresis loop at each temperature. It is apparent from FIG. 12 that the annealed FeRh—FePt nanoparticles exhibited a distinct antiferromagnetic to ferromagnetic transition during both heating and cooling process and the magnetization of the encapsulation increased at higher temperature. There was also a temperature hysteresis observed in the magnetization vs. temperature plot in FIG. 12. As can be seen in FIG. 12, the phase transition occurred over a wider temperature range compared to that previously observed in thin film FeRh samples and bare FeRh nanoparticles. The widening of the temperature hysteresis is similar to polycrystalline FeRh thin film on SiN. This is presumably related to the distribution in ordering or particle size. It is also likely that the magnetization of fct FePt may have contributed to the widening of the temperature hysteresis. The increase of magnetization of annealed FeRh—FePt nanoparticles commenced at 30° C. (FIG. 12) and increased from about 0.065 emu on heating at 30° C. to 0.11 emu at 220° C. during the heating process. At temperatures greater than 220° C. there was a small decrease in magnetization and is possibly attributed to the transformation of FeRh to paramagnetic above 220° C. During the cooling process, the magnetization gradually increased from 0.079 emu to 0.11 emu from 260° C. to 240° C. and then decreased from 0.11 emu to 0.067 emu from 240° C. to 30° C.

Temperature-dependent magnetization and X-ray diffraction measurements indicate the transformation of the antiferromagnetic phase to the ferromagnetic phase. However, the transformation occurs over a wider temperature range compared to that of thin film and nanoparticle FeRh systems. Furthermore, salt-matrix annealing effectively prevented agglomeration and coarsening of FeRh—FePt nanoparticle and transformed both FeRh and FePt into ordered phases. This is in striking contrast with the direct furnace annealing when the nanoparticles experienced abnormal growth and agglomeration between neighboring nanoparticles.

EXAMPLE 9

Alternatively, nanostructures were made wherein partially ordered FePt cores are encapsulated with FeRh. First, the partially ordered ferromagnetic FePt nanoparticle cores are synthesized. The synthesis of partially ordered FePt nanoparticles involves the thermal decomposition of iron pentacarbonyl ($Fe(CO)_5$) and platinum acetylacetonate ($Pt(acac)_2$) in a high boiling point solvent hexadecylamine. The experiments were carried out using standard airless procedures. A mixture of platinum acetylacetonate (120 mg), 1-adamantanecarboxylic acid (ACA 250 mg), and hexadecylamine (HDA 8 g) was heated to 100° C. in a three-necked round-bottom flask under a nitrogen atmosphere. After these chemicals were completely dissolved in HDA, the mixture was heated to 160° C., and $Fe(CO)_5$ (0.05 mL) was added to this solution via a syringe. Then the temperature was quickly increased to approximately 330° C. and held there for 3 hours. After cooling, the inert gas protected system could be opened to ambient environment. The product was precipitated by adding 40 ml of ethanol (or hexane). Then the mixture was centrifuged to isolate the particles from the supernatant. The final product, partially ordered FePt, was dispersed in hexane with oleic acid and oleylamine.

Then the FePt was encapsulated with FeRh. Iron (III) acetylacetonate ($Fe(acac)_3$, 159 mg) and rhodium (III) acetylacetonate ($Rh(acac)_3$, 100 mg) were mixed in phenyl ether (25 ml) with 1,12-dodecanediol (2.0 mmol, 400 mg) in the presence of oleic acid and oleylamine. The synthesis was carried out in a nitrogen atmosphere and the temperature of the mixed constituents was increased to 100° C. for 10 minutes to ensure that the precursors dissolved. Subsequently, 3 mL of the pre-prepared partially ordered FePt nanoparticles were added to the solution via a syringe at 100° C. The temperature was then raised to 200° C. and maintained at 200° C. for 2 hours. This was followed by increasing the temperature of the solution to reflux at 260° C. for 1 hour. After the synthesis, the product solution was cooled to room temperature. The precipitation and purification processes were repeatedly carried out a minimum of 3-4 times, and the final product FePt—FeRh core-shell nanostructure was finally dispersed in hexane.

Additional advantages and modifications will readily occur to those skilled in the art. Therefore, the inventive concept in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A method for creating FePt—FeRh nanostructures, said method comprising:
 a. mixing a reduction of a FePt solution, said FePt solution comprising platinum acetylacetonate, 1-adamantanecarboxylic acid, iron pentacarbonyl, and hexadecylamine;
 b. precipitating the FePt nanoparticles;
 c. mixing a FeRh solution, said FeRh solution comprising iron acetylacetonate, rhodium acetylacetonate, 1,12-dodecanediol, and phenyl ether;
 d. adding said FePt nanoparticles to the mixed FeRh solution;
 f. precipitating the FePt—FeRh nanostructures; and
 g. isolating said FePt—FeRh nanostructures.

2. The method of claim 1, wherein said FeRh—FePt nanostructures are dispersed on a substrate for use as a magnetic recording media.

* * * * *